Dec. 2, 1924.
F. ZINIS
EXTENSIBLE PIPE
Filed Sept. 7, 1923
1,517,335
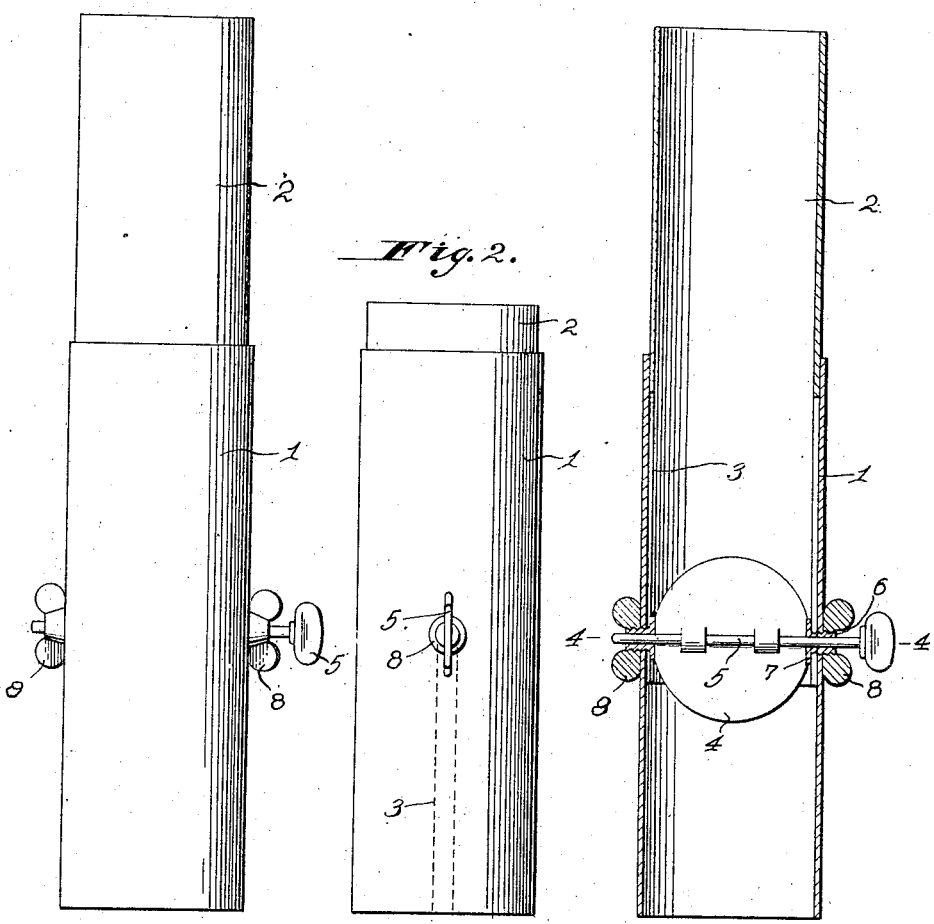
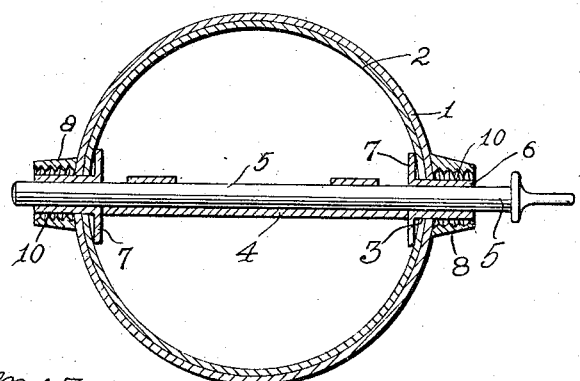
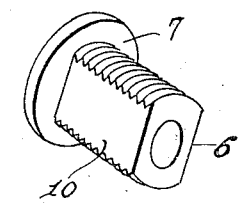
Fred Zinis
INVENTOR Patented Dec. 2, 1924.

1,517,335

UNITED STATES PATENT OFFICE.

FREDERICK ZINIS, OF ANCHORAGE, TERRITORY OF ALASKA.

EXTENSIBLE PIPE.

Application filed September 7, 1923. Serial No. 661,480.

*To all whom it may concern:*

Be it known that I, FREDERICK ZINIS, a citizen of the United States, residing at Anchorage, Territory of Alaska, United States, have invented new and useful Improvements in Extensible Pipes, of which the following is a specification.

This invention relates to an extensible pipe for stoves and the like, the general object of the invention being to provide means whereby a stove pipe can be easily and quickly taken down for cleaning or other purposes and put back in place without difficulty.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the invention,

Figure 2 is a view taken at right angles to Figure 1 and showing the parts telescoped.

Figure 3 is a sectional view with the parts in extended position.

Figure 4 is a section through line 4—4 of Figure 3.

Figure 5 is a view of one of the sleeves.

In these views, 1 and 2 indicate a pair of pipes, the pipe 2 telescoping into the pipe 1 and said pipe 2 has a pair of diametrically arranged slots 3 therein. The damper plate 4 is connected with a stem 5 which passes through holes in the pipe 1 and through the slots 3 so that one pipe can be moved in relation to the other without removing the damper. The pipes are held in adjusted position by means of the sleeves 6 which pass through the holes in the pipe 1 and through the slots in the pipe 2. These sleeves support the stem. Each sleeve is provided with a flange 7 which engages the inner wall of pipe 2 and is threaded to receive a wing nut 8 so that by tightening these nuts the two pipes will be clamped together. The sleeve is provided with flat parts or sides 10 which engage flat portions of the hole in the pipe 1 and the walls of slot 3 in pipe 2 so that the sleeve is prevented from having turning movement.

From the above it will be seen that the two pipes can be slid together by loosening the nuts so that the parts can be easily taken down for cleaning purposes or the like. When put back in place and the nuts tightened there will be no danger of the pipes becoming loose.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A stove pipe comprising two sections, telescopically arranged and the inner pipe having a pair of diametrically arranged slots which are covered by the outer pipe and said outer pipe having a pair of diametrically arranged holes therein which register with the slots, flanged sleeves passing through the slots and holes with their flanges engaging the inner walls of the inner pipe, said sleeves having flat portions for engaging the walls of the slots and the other portions of the sleeves being screw threaded, wing nuts engaging the threaded portions and a damper having its rod passing through the sleeves.

In testimony whereof I affix my signature.

FRED ZINIS.